United States Patent
Smyros et al.

(10) Patent No.: US 9,652,670 B1
(45) Date of Patent: May 16, 2017

(54) OMISSION DETECTION

(71) Applicants: Athena Ann Smyros, Richardson, TX (US); Constantine John Smyros, Richardson, TX (US)

(72) Inventors: Athena Ann Smyros, Richardson, TX (US); Constantine John Smyros, Richardson, TX (US)

( * ) Notice: Subject to any disclaimer, the term of this patent is extended or adjusted under 35 U.S.C. 154(b) by 0 days.

(21) Appl. No.: 14/465,018

(22) Filed: Aug. 21, 2014

Related U.S. Application Data

(60) Provisional application No. 61/868,090, filed on Aug. 21, 2013.

(51) Int. Cl.
*G06K 9/00* (2006.01)

(52) U.S. Cl.
CPC ... *G06K 9/00463* (2013.01); *G06K 2209/504* (2013.01)

(58) Field of Classification Search
CPC ...... H04N 1/00002; G06T 2207/30144; G06K 9/00463; G06K 2209/504; G06K 2209/01; G06K 9/00449; G06K 9/00456
See application file for complete search history.

(56) References Cited

U.S. PATENT DOCUMENTS

| | | | |
|---|---|---|---|
| 2006/0087674 A1* | 4/2006 | Lusen et al. | 358/1.14 |
| 2006/0218012 A1* | 9/2006 | Hernandez et al. | 705/3 |
| 2008/0273220 A1* | 11/2008 | Couchman | 358/1.15 |
| 2014/0365232 A1* | 12/2014 | Sadeghi | 705/2 |

* cited by examiner

*Primary Examiner* — Siamak Harandi
(74) *Attorney, Agent, or Firm* — Slater Matsil, LLP

(57) ABSTRACT

Omission Detection measures what is missing in a document, message, or file, and can perform this measurement for a single document, multiple documents, and even an entire repository.

3 Claims, 2 Drawing Sheets

OMISSION DETECTION

RELATED APPLICATIONS

This application claims priority from Provisional Application No. 61/868,090, "OMISSION DETECTION", filed 21 Aug. 2013, the disclosure of which is hereby incorporated herein by reference.

BACKGROUND

Currently, a myriad of communication devices are being rapidly introduced that need to interact with natural language in an unstructured manner. Communication systems are finding it difficult to keep pace with the introduction of devices as well as the growth of information.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION OF THE INVENTION

Omission Detection measures what is missing in a document, message, or file, and can perform this measurement for a single document, multiple documents, and even an entire repository. The omission may be detectable by using grammatical means within a single document, or by comparing elements of the document to other documents using a variety of techniques. Regardless, omission detection is crucial for automation projects that need to judge without human intervention whether there is sufficient information to make a decision about the use of a document for another purpose, such as use in search, data analytics, business intelligence, litigation, etc. Omissions may be tuned based on a specific implementation by modifying variables within calculations, such as including only those features of a document that are considered important, and translating this into a set of objects that may be used as a comparison. For example, one use for the embodiments described herein is to recognize missing information in a resume that is received by an employment company. For example, if a person lists a hobby of rebuilding cars, then the embodiments described herein would note that automotive mechanics' skill is omitted from the resume, and would attempt to either locate this information if other documents were available about this person in the repository or message back to the person for more information about what kind of cars he has worked on, and what he has rebuilt, such as an engine or a transmission.

Figure 1:
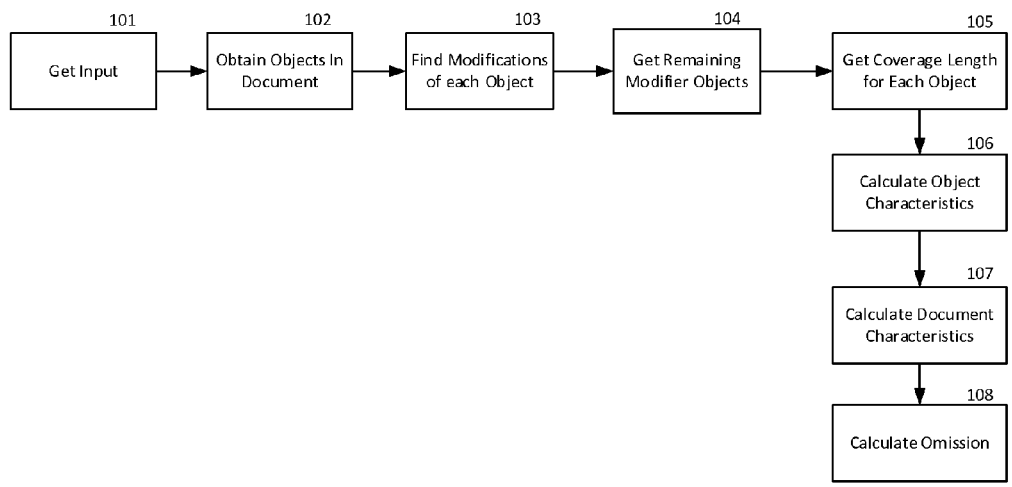
FIG. 1 illustrates an example of an Omission Detection Flowchart that is usable with the embodiments described herein.

The process of FIG. 1 starts by getting an input 101. An input may be any text, message, file, document, or any other finite text stream. Any communications channel can be used to transmit the information to the system based on implementation. Other communications, such as speech, etc. that is converted to text can be used with the system. Any number of unique documents can be used within the system, including a single file that is already an aggregation of files. The input, if a repository, can measure each document individually and then aggregate such results to come up with an entire repository omission report, including all the objects that are missing within the repository or other set of finite text streams.

Once the input has been received, then the system needs to obtain objects in the individual document 102. The system can work with any natural language analyzer. An object is considered to be a language representation of some physical, mental, or other kind of entity that is represented by a set of language elements, such as a noun or an adjective in standard part of speech terminology. Regardless of the way the objects are located in the document, there should be some checking to make sure that the object formation does not contain any modification, (e.g., adjectives modifying a noun) or can be separated into a modification and an object. For each unique object, information such as the number of objects, frequency of each object, some relation that is considered to be important for measurement of omission, and the length of the object at a minimum can be used.

As the objects are located, the system then finds all the modifications that are related to each object 103. There are varieties of modification that are related to the underlying language being used, and each variety discoverable by the system can be used. For instance, a modification that is related to an object that has a more important value, such as membership on a list, should be related to that object and examined for various conditions. If an object is also the subject of a sentence, then this is also considered more important from an omission point of view. If a modification contains an object, but is not considered important, then this modification can be considered less important or can be used to measure omission based on implementation. The optional get remaining modifier object function 104 can then be found. These may be considered less important if they are less important based on the structure of the document, and may be used to calculate a total omission picture, depending on the needs of the implementation. In some cases, the amount of omission has a focus, such as the input, and any omission is considered important, including any modification. In other cases, an omission of some modifier is less important; only the major objects based on some measure, like a topical measure, is used. In addition, a search may also be used to determine the importance of an object based on its frequency; such a general method is outlined in the U.S. application Ser. No. 13/402,775, entitled "SYSTEMS AND METHODS UTILIZING A SEARCH ENGINE", filed 22 Feb. 2012, the disclosure of which is hereby incorporated herein by reference in its entirety.

For each object that is used, including or excluding those based on modification, then the coverage length for each object 105 is found next. Depending on how much information is available to the system for object calculation, the coverage may be measured in the number of term units that are found within a sentence that contains the term object, or within some other textual constraint. The lengths of different objects may overlap in some cases; this should also be measured since it indicates a better coverage than those that are scattered around the document. Object characteristics are then calculated 106. Object characteristics can include both grammatical and extra-grammatical measures, such as the use of the object within the document, based on frequency, sentence structure, part of speech value, etc. Also, information about semantical relations of each object to other objects, including similarity to other objects, the similarity of modifications of different objects, a topical relation that indicates a hierarchical relation between objects, etc. can comprise the methods required for object characteristic discernment.

Once all the object characteristics are known, some of these will provide input to the document characteristics, which is counted next 107. The length of the document in term units should be calculated, along with the length of each object's coverage and relating these to arrive at a percentage or other kind of value. For example, a document that contains a small number of objects but is very long can be used, as should a document that contains a large number of objects but is very short and where the coverage is very small can also be used. These document characteristics may also include other information, such as the use of the document, the type document, such as a legal brief or a requirements list, etc.

At this point, there is enough information to calculate the omissions found in a document 108. All characteristics can be used to calculate omission by looking at the relation of the object to the entire document and then weighing that against the importance of the object as measured earlier. If the object is considered important and has limited coverage, then an omission might be true if there is poor or no modification of the object. If the object is well modified but the object itself does not refer to a semantically unique object, but contains several similar expressions, then this may affect the relation between it and the document measure. Each object can be analyzed by looking at its input characteristics to arrive at a final measure. The output of omission detection may be expressed as a number, a series of statements about the objects that contain omissions, and other such information about the lack of characteristics or amount of data that cannot be resolved by looking at the original document. This can be made available as simple text, a table, a graphic, or any other display method.

Depending on the implementation, it can take the output of this process and attempt to modify the current document by attempting to retrieve information about the object from other sources within the repository. In addition, topical and other contextualization information about the document can be provided about the current document so that the correct information is returned. For instance, if the document is about a job seeker, then information about the document type (a resume), and topics used in the document (cars, technology, etc.) may augment the omitted object measures to make sure that any information is returned by the retrieval process is contextually correct. For instance, if the skill set missing is about automotive mechanics, and a car reference is found, only items related to automobiles should be part of the missing skill set, not airplane mechanics, truck mechanics, etc. If the retrieval process within the repository locates useful information, the system may optionally modify the document with such information to resolve one or more omissions. If the retrieval process does not yield any information on one or more omitted items, an implementation may notify the owner or originator of the document of the one or more omissions so that the owner or originator may resolve the one or more omissions. These may be added to the original document, such as a resume for presentation to a company for a hiring manager's review.

Figure 2:
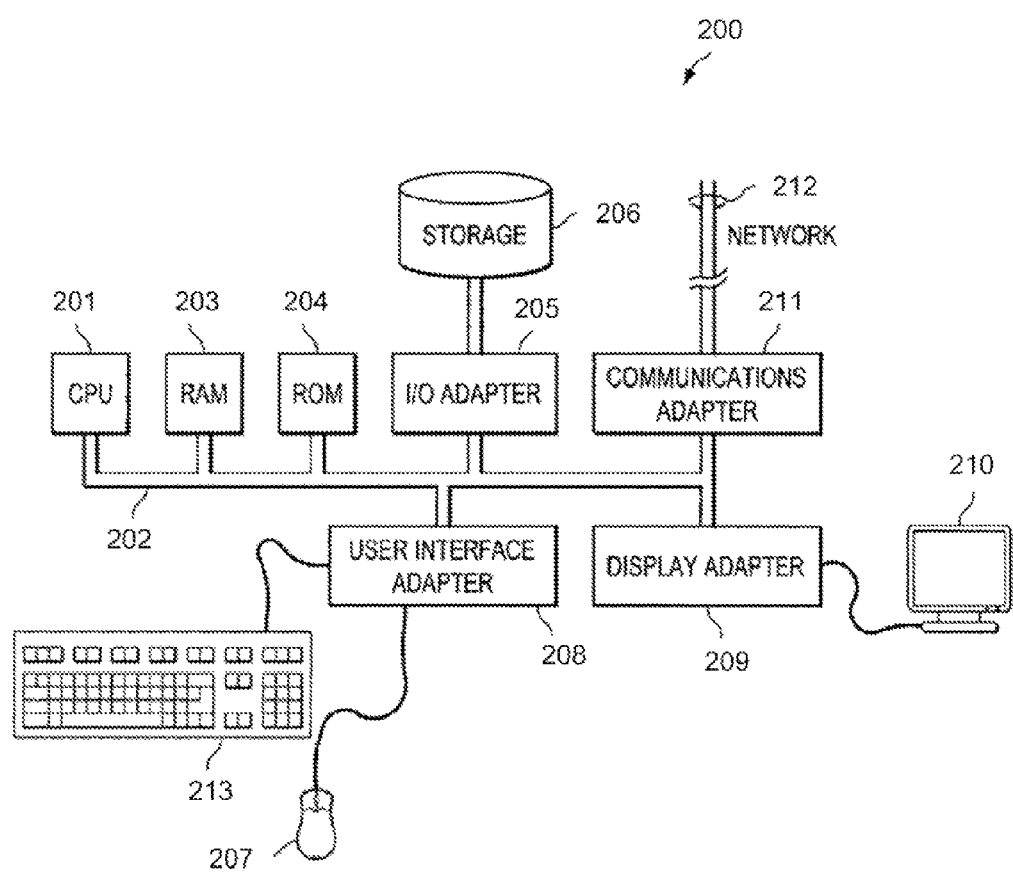
FIG. 2 depicts a block diagram of a computer system which is adapted to use the present invention.

FIG. 2 illustrates computer system 200 adapted to use the present invention. Central processing unit (CPU) 201 is coupled to system bus 202. The CPU 201 may be any general purpose CPU, such as an Intel Pentium processor. However, the present invention is not restricted by the architecture of CPU 201 as long as CPU 201 supports the operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 is also coupled to input/output (I/O) controller 205, communications adapter 211, user interface 208, and display 209. The I/O adapter card 205 connects to storage devices 206, such as one or more of flash memory, a hard drive, a CD drive, a floppy disk drive, a tape drive, to the computer system. Communications 211 is adapted to couple the computer system 200 to a network 212, which may be one or more of a telephone network, a local (LAN) and/or a wide-area (WAN) network, an Ethernet network, and/or the Internet network. User interface 208 couples user input devices, such as keyboard 213, pointing device 207, to the computer system 200. The display card 209 is driven by CPU 201 to control the display on display device 210.

Note that any of the functions described herein may be implemented in hardware, software, and/or firmware, and/or any combination thereof. When implemented in software, the elements of the present invention are essentially the code segments to perform the necessary tasks. The program or code segments can be stored in a computer readable medium. The "computer readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

What is claimed is:

1. A computer program product stored on a non-transitory computer-readable medium having computer program logic recorded thereon for measuring word object omissions in a document, the computer program product comprising:
   code for receiving the document from an originator;
   code for locating a plurality of word objects within the document;
   code for determining a plurality of modifiers, with at least one modifier for each located word object;
   code for determining a coverage length for each located word object, wherein the code for determining the coverage length involves the plurality of modifiers;
   code for calculating a plurality of characteristics, with one characteristic for each located word object;
   code for calculating a characteristic for the document; and
   code for determining at least one word object omission from the document using the one coverage length and the one characteristic for each located word object, and the characteristic for the document, wherein the code for determining is operative to determine the one word object omission using only the document.

2. The computer program product of claim 1, further comprising: code for modifying the document to include information to resolve the at least one word object omission from other information sources.

3. The computer program product of claim 1, further comprising: code for notifying the originator of the document of the at least one word object omission, whereby the originator modifies the document to include information to resolve the at least one word object omission.

\* \* \* \* \*